(12) United States Patent
Aimura et al.

(10) Patent No.: US 9,758,098 B2
(45) Date of Patent: Sep. 12, 2017

(54) VEHICLE PERIPHERY MONITORING DEVICE

(71) Applicant: HONDA MOTOR CO., LTD., Minato-Ku, Tokyo (JP)

(72) Inventors: Makoto Aimura, Saitama (JP); Kodai Matsuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 72 days.

(21) Appl. No.: 14/908,268

(22) PCT Filed: Jun. 12, 2014

(86) PCT No.: PCT/JP2014/065625
§ 371 (c)(1),
(2) Date: Jan. 28, 2016

(87) PCT Pub. No.: WO2015/015919
PCT Pub. Date: Feb. 5, 2015

(65) Prior Publication Data
US 2016/0176339 A1 Jun. 23, 2016

(30) Foreign Application Priority Data

Aug. 1, 2013 (JP) ................................ 2013-160646

(51) Int. Cl.
*B60Q 9/00* (2006.01)
*B60R 1/00* (2006.01)
(Continued)

(52) U.S. Cl.
CPC ............... *B60Q 9/008* (2013.01); *B60R 1/00* (2013.01); *G08G 1/166* (2013.01); *B60K 37/02* (2013.01);
(Continued)

(58) Field of Classification Search
CPC . G08B 29/18; G06K 9/00; G06T 7/00; G08G 1/056; G08G 1/167; G08G 1/166;
(Continued)

(56) References Cited

U.S. PATENT DOCUMENTS 6,502,035 B2* 12/2002 Levine .................. B60Q 1/346
340/465
7,280,037 B2* 10/2007 Arai ....................... B60K 37/02
340/438
(Continued)

FOREIGN PATENT DOCUMENTS

JP 2001-006096 A 1/2001
JP 2001-357498 A 12/2001
(Continued)

OTHER PUBLICATIONS

Office Action dated Aug. 23, 2016 issued in the counterpart Japanese Patent Application 2015-529443.
(Continued)

*Primary Examiner* — Behrang Badii
(74) *Attorney, Agent, or Firm* — Carrier Blackman & Associates, P.C.; Joseph P. Carrier; William D. Blackman (57) ABSTRACT

A vehicle periphery monitoring device comprises: an in-region object detecting unit which detects an in-region object present in contact determination regions on the basis of a photographic image from a camera per prescribed control cycle; and a warning control unit which performs warning control processing to give warning of a detected in-region object when an in-region object was not detected in the last control cycle, but the in-region object was detected in the present control cycle, and to restrain warning of a new in-region object when an in-region object was detected in the last control cycle and the new in-region
(Continued)

object different from the in-region object detected in the last control cycle has been detected in the present control cycle.

5 Claims, 6 Drawing Sheets (51) Int. Cl.
| | |
|---|---|
| B60Q 1/00 | (2006.01) |
| G06T 7/00 | (2017.01) |
| B60T 8/1755 | (2006.01) |
| B60T 7/12 | (2006.01) |
| B60K 37/02 | (2006.01) |
| B60Q 1/34 | (2006.01) |
| B60R 21/0134 | (2006.01) |
| G01C 21/26 | (2006.01) |
| G01S 13/93 | (2006.01) |
| G08G 1/056 | (2006.01) |
| G08G 1/01 | (2006.01) |
| G06K 9/00 | (2006.01) |
| G08G 1/123 | (2006.01) |
| B62D 15/02 | (2006.01) |
| G08B 29/18 | (2006.01) |
| G08G 1/16 | (2006.01) |

(52) U.S. Cl.
CPC ............. *B60Q 1/00* (2013.01); *B60Q 1/346* (2013.01); *B60R 21/0134* (2013.01); *B60R 2300/8093* (2013.01); *B60T 7/12* (2013.01); *B60T 8/17557* (2013.01); *B62D 15/029* (2013.01); *G01C 21/26* (2013.01); *G01S 13/93* (2013.01); *G01S 13/931* (2013.01); *G06K 9/00* (2013.01); *G06K 9/00798* (2013.01); *G06T 7/00* (2013.01); *G08B 29/18* (2013.01); *G08G 1/01* (2013.01); *G08G 1/056* (2013.01); *G08G 1/123* (2013.01); *G08G 1/167* (2013.01)

(58) Field of Classification Search
CPC ..... G01S 13/931; B60R 21/0134; B60Q 1/00; B60Q 1/346; B60Q 9/008; B60K 37/02; B62D 15/00; B62D 15/029; B62D 15/02; G01C 21/26; B60T 7/12; B60T 8/17557; G07C 5/00
See application file for complete search history.

(56) References Cited

U.S. PATENT DOCUMENTS

| | | | |
|---|---|---|---|
| 7,424,364 B2* | 9/2008 | Gern | B62D 15/029 340/435 |
| 8,896,433 B2* | 11/2014 | Danner | B60T 8/17557 340/435 |
| 9,064,408 B2* | 6/2015 | Komoguchi | G08G 1/167 |
| 2002/0019703 A1* | 2/2002 | Levine | B60Q 1/346 701/301 |
| 2005/0273264 A1* | 12/2005 | Gern | B62D 15/029 701/301 |
| 2006/0049927 A1* | 3/2006 | Arai | B60K 37/02 340/438 |
| 2009/0033477 A1* | 2/2009 | Illium | B60R 21/0134 340/436 |
| 2014/0015693 A1* | 1/2014 | Komoguchi | G08G 1/167 340/935 |
| 2015/0161881 A1* | 6/2015 | Takemura | G06K 9/00798 348/148 |

FOREIGN PATENT DOCUMENTS

| | | |
|---|---|---|
| JP | 2009271766 | 11/2009 |
| JP | 2012-216142 A | 11/2012 |
| JP | 2013-088894 A | 5/2013 |

OTHER PUBLICATIONS

Office Action dated Mar. 14, 2017 issued in the counterpart Japanese Patent Application 2015-529443.

* cited by examiner

VEHICLE PERIPHERY MONITORING DEVICE

TECHNICAL FIELD

The present invention relates to a vehicle periphery monitoring device which monitors an object present at the periphery of a vehicle.

BACKGROUND ART

Conventionally, a vehicle periphery monitoring device which gives warning to a driver by determining a possibility that the drivers vehicle will contact with an object (monitored object) present at the periphery of the vehicle is known (for example, see Patent Literature 1).

CITATION LIST

Patent Literature

Patent Literature 1: Japanese Patent Laid-Open No. 2001-6096

SUMMARY OF INVENTION

Technical Problem

A vehicle periphery monitoring device described in Patent Literature 1 calls a driver's attention by giving warning when it has detected an object having high probability of contacting with the driver's vehicle. This causes a state in which the driver is directing attention to a direction where the object is present.

The vehicle periphery monitoring device, however, gives warning whenever a new object appears. Getting consecutive warnings like this is bothersome for the driver who has already directed his/her attention.

The present invention is made in the light of the above-described points, and its objective is to provide a vehicle periphery monitoring device capable of appropriately giving necessary warning while preventing a driver from feeling bothersome.

Solution to Problem

The present invention comprises: an in-region object detecting unit which detects an in-region object that is an object present in a contact determination region set at a periphery of a vehicle, based on detection data obtained by a thing detecting device which is mounted on the vehicle and detects a thing per prescribed control cycle; and a warning control unit which performs warning control processing to give warning of a detected in-region object when the in-region object was not detected by the in-region object detecting unit in a last control cycle, but the in-region object is detected by the in-region object detecting unit in a present control cycle, and to restrain warning of a new in-region object when the in-region object was detected by the in-region object detecting unit in the last control cycle, and the new in-region object different from the in-region object detected in the last control cycle is detected by the in-region object detecting unit in the present control cycle.

In the present invention, the warning control unit gives warning to direct attention of a driver of the vehicle to the detected in-region object when the in-region object was not detected by the in-region object detecting unit in the last control cycle, but the in-region object has been detected by the in-region object detecting unit in the present control cycle. This can appropriately give necessary warning to the driver.

On the other hand, when an in-region object was detected by the in-region object detecting unit in the last control cycle, and a new in-region object different from the in-region object detected in the last control cycle has been detected in the present control cycle, warning was given at least by the last control cycle. Therefore, the driver of the vehicle is considered to be in a state of directing their attention to the contact determination region due to the previously given warning.

In this state, it is assumed that the driver will recognize the new in-region object even if warning of the new in-region object is restrained. Thus, the warning control unit can prevent the driver from feeling bothersome about warning by restraining the warning.

In the present invention, it is preferable that a plurality of the contact determination regions are set, the in-region object detecting unit detects the in-region object in each contact determination region, and the warning control unit performs the warning control processing for each contact determination region. This configuration can appropriately give necessary warning while preventing the driver from feeling bothersome caused by consecutively receiving warning of each contact determination region.

In the case where there is an in-region object in any one of the contact determination region among the contact determination regions and thereby the driver's attention is directed to the contact determination region, if a new in-region object has appeared in another contact determination region different from the contact determination region, the warning control unit can have the driver gaze at the new in-region object by giving warning of the new in-region object.

In the present invention, it is preferable that the plurality of contact determination regions are made up of a first region situated in a travelling direction of the vehicle and two second regions situated in left and right directions of the vehicle relative to the first region. Among regions at the periphery of the vehicle, the first region situated in the travelling direction of the vehicle and the second regions situated in the left and right directions of it are regions where there is high probability of the vehicle contacting with an object. Thus, setting the first region and the second regions to the plurality of contact determination regions enables valuable warning to the driver.

In the present invention, it is preferable that the present invention comprises a gaze determining unit which determines whether the driver of the vehicle is gazing at the contact determination regions or not, and if the gaze determining unit has determined that the driver of the vehicle is not gazing at the contact determination regions, the warning control unit does not restrain warning of the new in-region object and gives warning of the new in-region object.

According to this configuration, if the gaze determining unit has determined that the driver is not gazing at the contact determination regions, there is a possibility that the driver has not recognized the new in-region object even if warning was given already. Thus, in this case, the warning control unit does not restrain warning, and gives normal warning. This allows the driver's attention to be directed to the new in-region object.

In the present invention, it is preferable that the present invention comprises a type detecting unit which detects a type of the in-region object, and if a type of the new in-region object detected by the type detecting unit in the present control cycle is different from a type of the in-region object detected by the type detecting unit in the last control cycle, the warning control unit does not restrain warning of the new in-region object, but gives warning of the new in-region object.

According to this configuration, the type detecting unit detects a type of object. The type of object is a human, a wild animal (such as a deer and a monkey), or the like. If the type of object is different, the driver needs to respond differently depending on the type. Thus, even if the driver's attention is directed to the contact determination regions, if a type of a new in-region object is different, the warning control unit can prompt the driver to respond correspondingly to the type of object by giving warning of the new in-region object.

In the present invention, it is preferable that the warning control unit performs, as the warning, image display processing to display a position corresponding to a real space position of the in-region object on a display device mounted on the vehicle, and sound generating processing to generate attention calling sound from a sound generating device mounted on the vehicle, and restrains the warning by only performing the image display processing among the image display processing and the sound generating processing.

According to this configuration, if an in-region object has appeared in a contact determination region where there was no in-region object in the last control cycle, there is a high probability that the driver's attention is not directed to the contact determination region. Therefore, in this case, the warning control unit gives warning perceived by the senses of hearing and vision, and thereby can give stronger warning to the driver. On the other hand, if a new in-region object has appeared in a contact determination region where there was an in-region object already in the last control cycle, the driver is expected to recognize the new in-region object even if warning is restrained. Therefore, the warning control unit can prevent the driver from feeling bothersome while calling requisite minimal attention by only giving warning perceived by the sense of vision without calling attention perceived especially by the sense of hearing that makes the driver feel bothersome.

BRIEF DESCRIPTION OF DRAWINGS

FIGS. 5A-5C are diagrams showing three contact determination regions of a first region Ar1, a second region Ar2, and a third region Ar3; where

FIGS. 6A-6C are diagrams showing display contents of a display device; where

DESCRIPTION OF EMBODIMENTS

Figure 1:
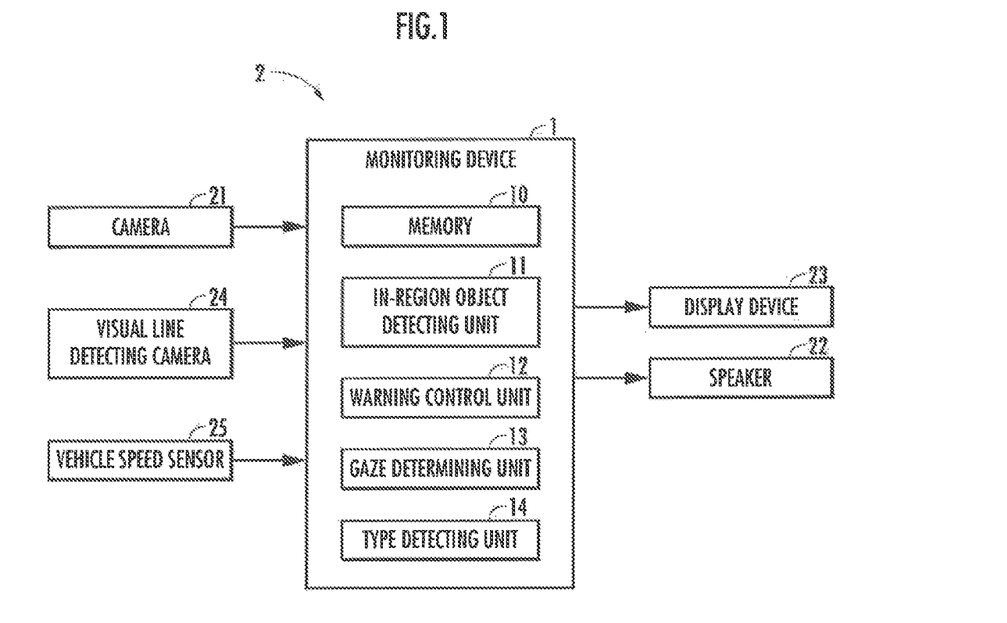
FIG. 1 is a configuration diagram of a vehicle periphery monitoring device in an embodiment of the present invention.

A vehicle periphery monitoring device (hereinafter simply called a "monitoring device") in an embodiment of the present invention will be explained below. Referring to FIG. 1, a monitoring device 1 is connected with: a monocular infrared camera 21 (hereinafter simply called a "camera 21" and the camera 21 corresponds to a thing detecting device of the present invention) capable of detecting a far infrared ray; a sound generating device 22 (for example, an on-vehicle speaker) to call attention by sound; a head up display 23 (hereinafter called a "display device 23") to display an image obtained by the camera 21 and to perform display to have a driver visually recognize an object having a high probability of contact; a visual line detecting camera 24 to detect a visual line of the driver; and a vehicle speed sensor 25 to detect travelling speed of a vehicle 2.

Figure 2:
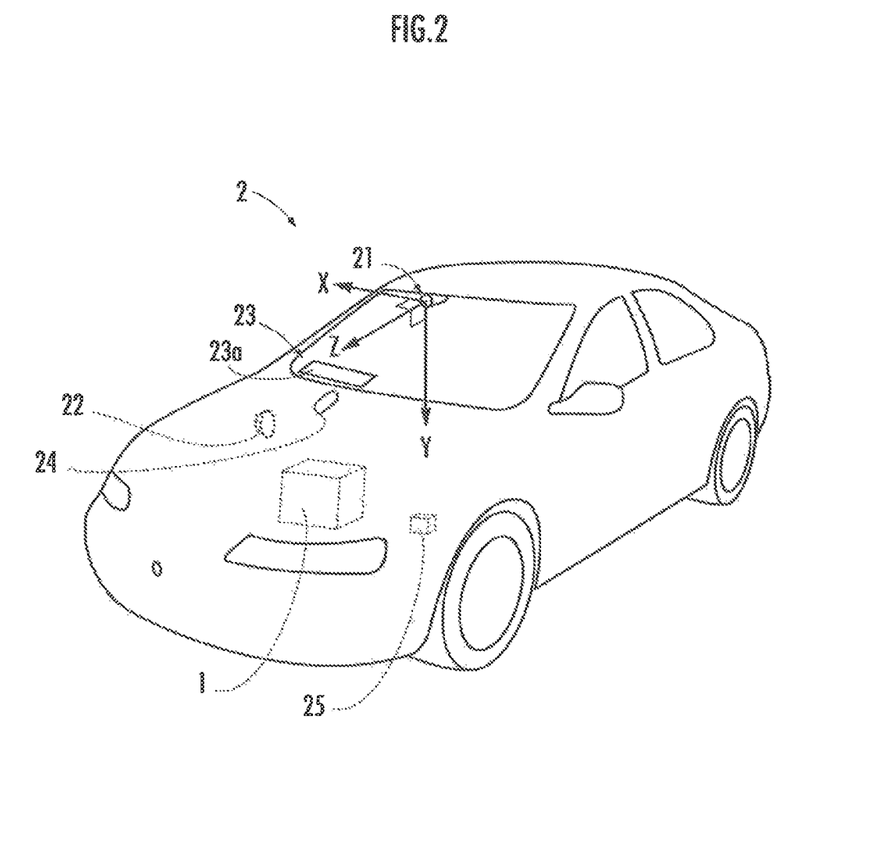
FIG. 2 is a schematic diagram showing a way to mount the vehicle periphery monitoring device shown in FIG. 1 on a vehicle.

Referring to FIG. 2, the camera 21 is arranged at a front part of the vehicle 2, and has a characteristic in which the higher temperature of an imaged subject is, the higher an output level is (luminance becomes larger). The sound generating device 22 is arranged at a driver's seat side so that it can generate sound toward the driver of the vehicle 2. The display device 23 is provided such that a screen 23a be displayed at a front position of a driver side of a windshield of the vehicle 2.

The visual line detecting camera 24 is arranged in the vicinity of an instrument panel at the driver's seat side of the vehicle 2. The visual line detecting camera 24 first radiates an infrared ray toward the face or an eyeball of the driver when detecting a visual line of the driver of the vehicle 2. At this time, by receiving an infrared ray reflected from the face or the eyeball of the driver, the visual line detecting camera 24 detects the direction of the visual line of the driver.

In addition, referring to FIG. 1, the monitoring device 1 is an electronic unit comprising a microcomputer (not shown) and the like, and has a function to convert an analog video signal output from the camera 21 into digital data to take it in a memory 10, and to perform a variety of calculation processing for an image in front of the vehicle 2 taken in the memory 10 by the microcomputer.

The monitoring device 1 functions as an in-region object detecting unit 11, a warning control unit 12, a gaze determining unit 13, and a type detecting unit 14 by having the microcomputer run a vehicle monitoring program.

The in-region object detecting unit 11 detects an in-region object that is an object present in a contact determination region described later in detail) set in front (travelling direction) of the vehicle 2 on the basis of a photographic image (corresponding to detection data of the present invention) of forward of the vehicle 2 taken by the camera 21 per prescribed control cycle.

The warning control unit 12 performs warning control processing. The warning control processing is processing which gives warning of a detected in-region object "when an in-region object was not detected by the in-region object detecting unit 11 in a last control cycle but the in-region object has been detected by the in-region object detecting unit 11 in a present control cycle (hereinafter, this situation is called "when a first condition is met")", and which restrains warning of a new in-region object "when an in-region object was detected by the in-region object detecting unit 11 in the last control cycle and the new in-region object different from the in-region object detected in the last control cycle has been detected by the in-region object detecting unit 11 in the present control cycle (hereinafter, this situation is called "when a second condition is met")."

The gaze determining unit 13 determines whether or not the driver of the vehicle 2 is gazing at contact determination regions Ar1, Ar2, Ar3 (see FIGS. 5A-5C, described later in detail) by a visual line direction detected by the visual line detecting camera 24. The type detecting unit 14 detects a type of in-region object. The type of in-region object is a human, a wild animal (such as a deer and a monkey), or the like.

Next, a succession of object monitoring processing by the monitoring device 1 will be explained according to a flow-chart shown in FIG. 3. The monitoring device 1 monitors the periphery of the vehicle 2 by performing processing by the flowchart shown in FIG. 3 per prescribed control cycle (for example, 10 msec).

In first step ST1, the monitoring device 1 inputs an analog video signal output from the camera 21, and takes a gray scale image about which the video signal is converted into digital gradation (luminance) data in the memory 10. Then, the monitoring device 1 performs pattern matching on the gray scale image taken in the memory 10 by using template patterns for multiple types of objects prepared in advance.

By this, the monitoring device 1 extracts an image part of an object from the photographic image by the camera 21. Then, the monitoring device 1 obtains a real space position of the object (extracts the object) by transforming the position of the image part of the object (position in camera coordinates) into a real space position (position in real space coordinates) by projection transformation.

In the following step ST2, the monitoring device 1 sets the first region Ar1 to an object region, and performs warning control processing (control processing shown in FIG. 4 and described later in detail). The object region is a contact determination region which is an object of warning control processing in FIG. 4 among the plurality of contact determination regions Ar1, Ar2, Ar3. The monitoring device 1 sets the first region Ar1 among the contact determination regions Ar1, Ar2, Ar3 to an object of warning control processing in step ST2.

The contact determination region is a region set at the periphery of the vehicle 2 in order to determine a contact probability between the object and the vehicle 2. In the embodiment, as the contact determination region, three regions such as the first region Ar1, the second region Ar2, and the third region Ar3 are set. In particular, the first region Ar1 is set in the travelling direction of the vehicle, the second region Ar2 is set on the right side of the first region Ar1 in the travelling direction of the vehicle, and the third region Ar3 is set on the left side of the first region Ar1 in the travelling direction of the vehicle. The second region Ar2 and the third region Ar3 correspond to "two second regions" of the present invention.

Figure 5A:
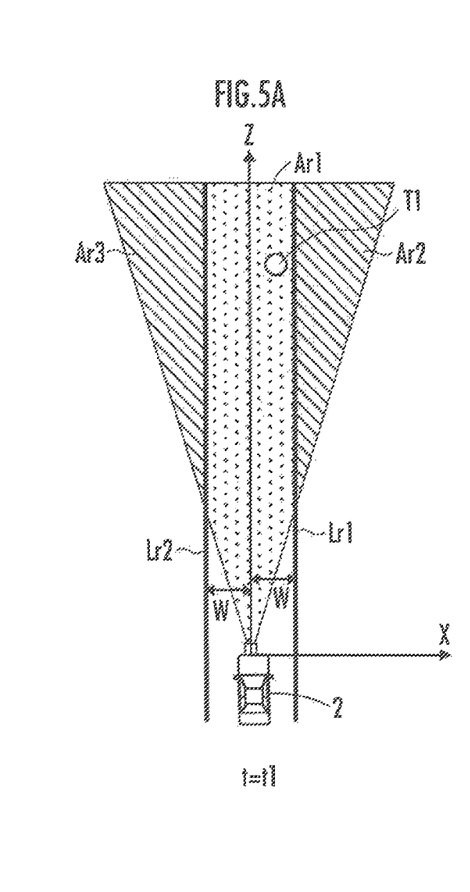
FIG. 5A is a diagram showing a state in which an object T1 is present in the first region Ar1.

FIG. 5A shows the travelling direction of the vehicle 2 as Z and the width direction of the vehicle 2 orthogonal to Z as X. In addition, Lr1 is a division line at a right side of a driving lane of the vehicle 2, Lr2 is a division line at a left side of the driving lane of the vehicle 2, and W is distance between a central part of the vehicle 2 and the division lines Lr1 and Lr2 when the vehicle 2 is travelling at the center of the driving lane. In each contact determination region Ar1, Ar2, Ar3, its length in the Z direction is set to length estimated that the vehicle 2 will arrive after the elapse of a prescribed time. In particular, the estimated length is set on the basis of the travelling speed of the vehicle 2 detected by the vehicle speed sensor 25 and the prescribed time.

In the following step ST3, the monitoring device 1 sets the second region Ar2 to the object region and performs warning control processing.

In the following step ST4, the monitoring device 1 sets the third region Ar3 to the object region and performs warning control processing.

The monitoring device 1 determines in the following step ST5 whether or not there is an in-region object in the contact determination regions Ar1, Ar2, Ar3.

If the monitoring device 1 has determined in step ST5 that there is no in-region object existing in any of all the contact determination regions Ar1 Ar2, Ar3, it proceeds to step ST6. In step ST6, the monitoring device 1 terminates all warning. For example, because the image in the travelling direction of the vehicle 2 continues to be displayed on the screen 23a of the display device 23 after execution of processing in step ST104 in FIG. 4 described below, the monitoring device 1 performs processing such as deleting this display.

Figure 3:
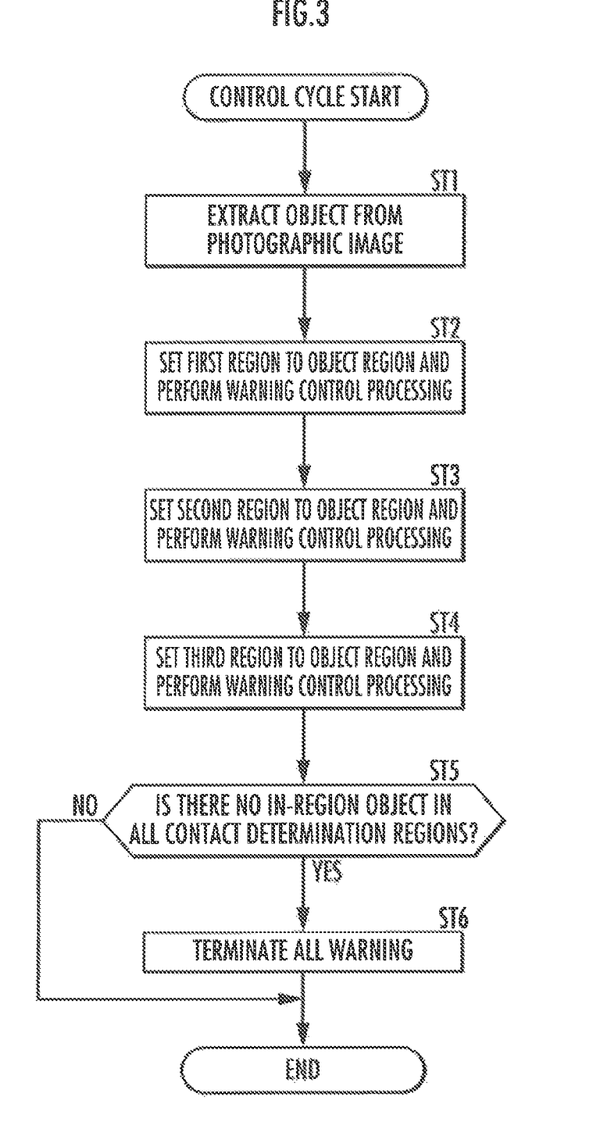
FIG. 3 is a flowchart showing a processing procedure in the vehicle periphery monitoring device shown in FIG. 1.

If the monitoring device 1 has determined in step ST5 that there is an in-region object in any of the contact determination regions Ar1, Ar2, Ar3, or when step ST6 ends, the monitoring device 1 terminates processing in the present control cycle (that is, processing shown in the flowchart in FIG. 3).

Next, warning control processing shown in FIG. 4 performed by the monitoring device 1 will be explained. The warning control processing is performed for each contact determination region (Ar1, Ar2, Ar3) set as the object region in each of above-described steps ST2-ST4.

In addition, in explanation described below, an explanation will be given referring to FIGS. 5A-5C and FIGS. 6A-6C in addition to FIG. 4. FIG. 5A is a diagram showing a state in which an object T1 is present in the first region Ar1. FIG. 6A shows display contents of the screen 23a of the display device 23 in the state in FIG. 5A. Hereinafter, a time point of FIG. 5A and FIG. 6A (photographing time point) (t) is called a "first time point t1."

Figure 5B:
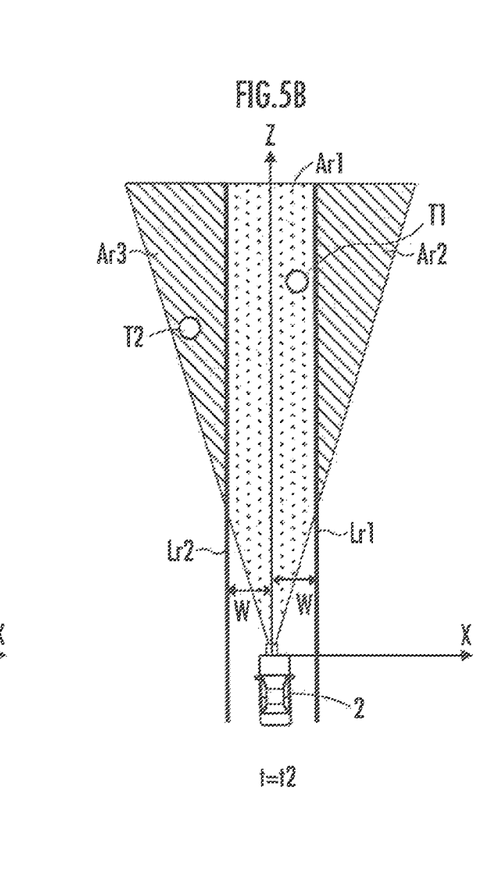
FIG. 5B is a diagram showing a state in which a new object T2 has appeared in the third region Ar3 from the state in FIG. 5A.
Figure 6A:
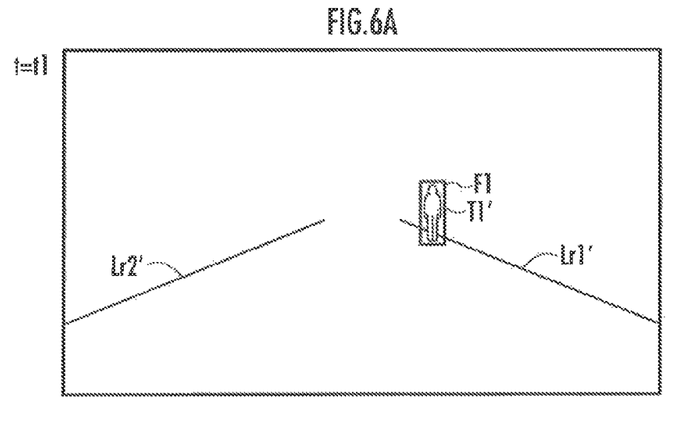
FIG. 6A is a diagram showing display contents of the state in FIG. 5A.
Figure 6B:
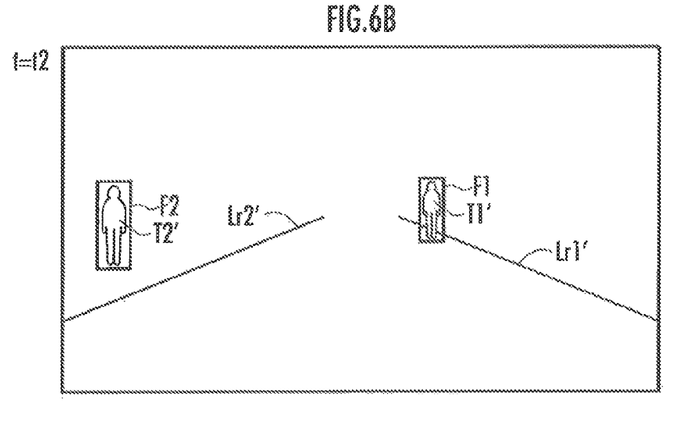
FIG. 6B is a diagram showing display contents of the state in FIG. 5B.

Furthermore, FIG. 5B is a diagram showing a state in which a new object T2 has appeared in the third region Ar3 after the elapse of one control cycle from the state in FIG. 5A. FIG. 6B shows display contents of the screen 23a of the display device 23 in the state in FIG. 5B. Hereinafter, a time point of FIG. 5B and FIG. 6B (photographing time point) (t) is called a "second time point t2."

Figure 5C:
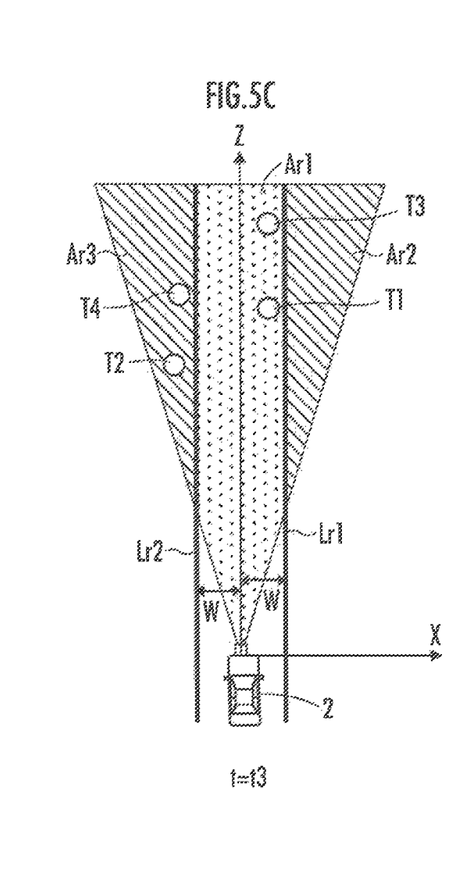
FIG. 5C is a diagram showing a state in which a new object T3 has appeared in the first region Ar1 and a new object T4 has appeared in the third region Ar3 from the state in FIG. 5B.
Figure 6C:
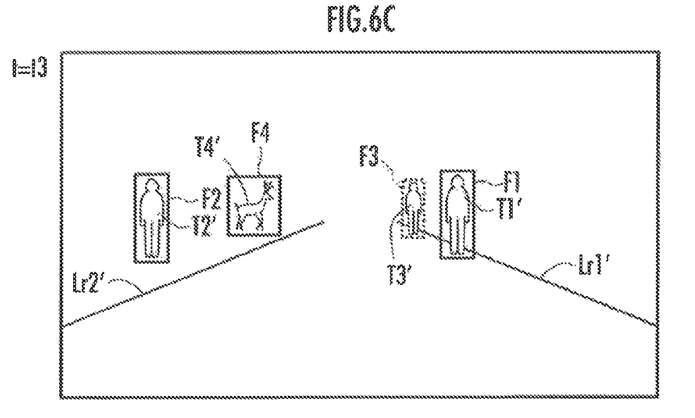
FIG. 6C is a diagram showing display contents of the state in FIG. 5C.

Furthermore, FIG. 5C is a diagram showing time when a new object T3 different from the already existing object T1 has appeared in the first region Ar1 and a new object T4 different from the already existing object T2 has appeared in the third region Ar3 after the elapse of one control cycle from the state in FIG. 5B. FIG. 6C shows display contents of the screen 23a of the display device 23 in the state in FIG. 5C. Hereinafter, a time point of FIG. 5C and FIG. 6C (photographing time point) (t) is called a "third time point t3."

In FIGS. 6A-6C, by adding "'" at the tail end of each of image parts corresponding to the objects T1, T2, T3, T4 and the division lines Lr1, Lr2, image parts of the objects T1', T2', T3', T4' and the image parts of the division lines Lr1', Lr2' are represented.

In addition, in the embodiment, an example of the in-region objects T1, T2, T3 being humans and the in-region object T4 being a deer is used.

Figure 4:
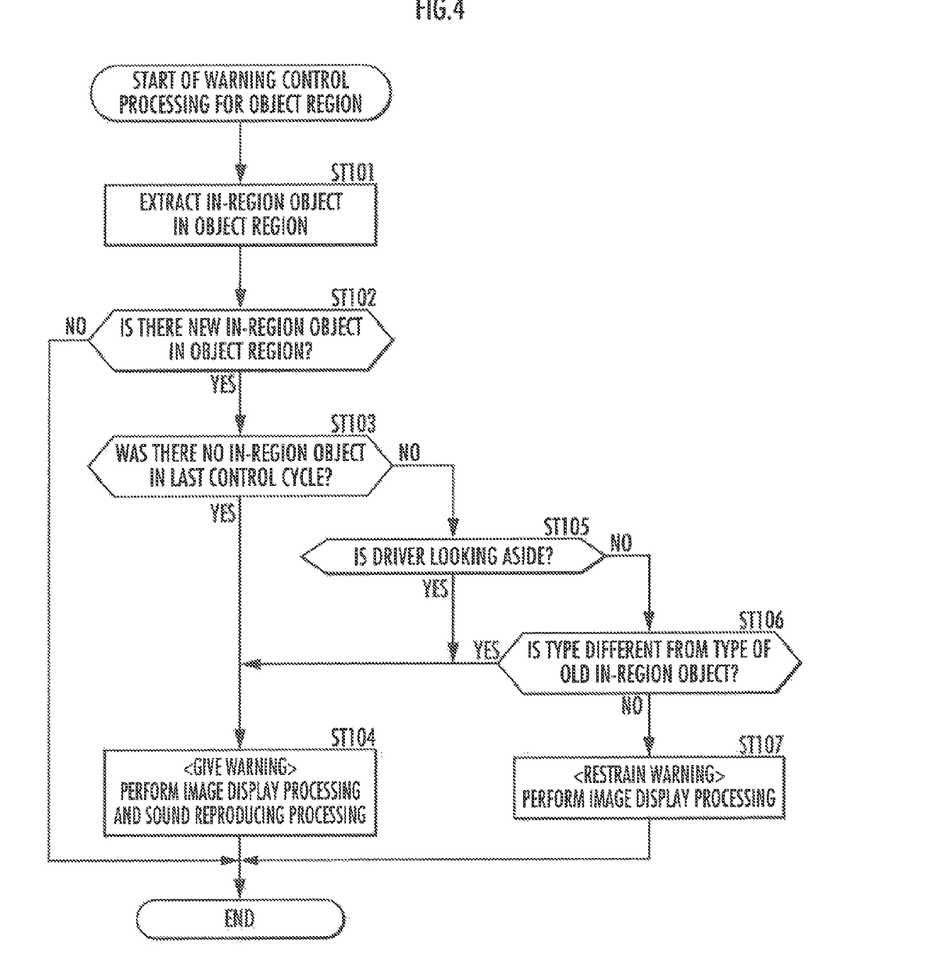
FIG. 4 is a flowchart showing a warning control processing procedure to an object region in steps ST2-ST4 in FIG. 3.

First, warning control processing when the object region is set to the first region Ar1 in step ST2 in FIG. 3 is explained in the order from the first time point t1 to the third time point t3 referring to FIG. 4.

At the first time point t1 and in first step ST101 in FIG. 4, the monitoring device 1 extracts an object included in the object region (first region Ar1) set at the present time point (hereinafter, such an object is called an "in-region object") from objects extracted in step ST1 in FIG. 3. The monitoring device 1 extracts the object T1 as the in-region object in the present step ST101.

A configuration for performing processing of the present step ST101 corresponds to the in-region object detecting unit 11.

In the following step ST102, the monitoring device 1 determines whether or not there is a new in-region object in the object region (first region Ar1). The new in-region object is an in-region object which was not present in the object region (first region Ar1) in the last control cycle, but is present in the object region (first region Ar1) in the present control cycle.

Because the present control processing starts at the first time point t1, there is no "last control cycle" at the first time point t1. Therefore, at the first time point t1, the monitoring device 1 determines that "there was no in-region object in the object region in the last control cycle."

Consequently, at the first time point t1, the in-region object T1 is detected as a new in-region object in the object region (first region Ar1). Therefore, the monitoring device 1 determines in the present step ST102 that there is a new in-region object.

If the monitoring device 1 has determined in step ST102 that there is a new in-region object in the object region (first region Ar1), it proceeds to step ST103. In step ST 103, the monitoring device 1 determines whether or not there was an in-region object in the object region (first region Ar1) in the last control cycle.

As described above, the monitoring device 1 determines in step ST103 that there was no in-region object in the object region (first region Ar1) in the last control cycle at the first time point t1.

If the monitoring device 1 has determined in step ST103 that there was no in-region object in the object region (first region Ar1) in the last control cycle (if the above-mentioned first condition is met), it proceeds to step ST104. In step ST104, the monitoring device 1 gives warning. In particular, the monitoring device 1 performs image display processing and sound generating processing.

The image display processing is processing to display a position corresponding to the real space position of an in-region object on the display device 23 (see FIGS. 6A-6C). In particular, the monitoring device 1 displays a photographic image of the travelling direction of the vehicle 2 taken with the camera 21 by performing image display processing.

At this time, processing to emphasize the position in the photographic image corresponding to the real space position of the in-region object is applied to the photographic image. Emphasizing processing is, for example, processing to add a frame (F1, F2, F3, F4 in FIGS. 6A-6C) surrounding an image part corresponding to the in-region object on the photographic image as shown in FIGS. 6A-6C.

In addition, when warning is given in step ST104, if other information is already displayed on the screen 23a of the display device 23, the monitoring device 1 breaks in the display of the other information, and performs display by the image display processing.

The sound generating processing is processing to generate attention calling sound from the sound generating device 22.

In the embodiment, sound generated by sound generating processing is stopped after the elapse of a prescribed time, but a frame displayed by image display processing is displayed along with movement of the in-region object until step ST6 in FIG. 3 is performed, or a prescribed in-region object with a frame displayed moves out of all the contact determination regions Ar1, Ar2, Ar3.

The monitoring device 1 terminates the flowchart shown in FIG. 4 when the present step ST104 ends.

Next, an explanation will be given on warning control processing in FIG. 4 when the object region is set to the first region Ar1 at the second time point t2 in the next control cycle after the first time point t1.

The monitoring device 1 extracts the object T1 as an in-region object in step ST101. Then, in the following step ST102, the monitoring device 1 determines whether or not there is a new in-region object in the object region (first region Ar1).

Because the in-region object (for example, T1) moves, it changes its position with time. For this reason, the monitoring device 1 needs to determine whether in-region objects (for example, T1) at different positions in the last control cycle and the present control cycle are the same or not. The embodiment has adopted an already known technique for the determination. For example, this is determined on the basis of whether or not they satisfy a prescribed sameness determination condition (a condition to determine the sameness) described in, for example, Japanese Patent Laid-Open No. 2001-6096, which is a patent application by the applicant of the present application.

According to this, the monitoring device 1 determines that the in-region object T1 at the first time point t1 and the in-region object T1 at the second time point t2 are the same. Then, the monitoring device 1 determines in the present step ST102 that there is no new in-region object in the object region (first region Ar1), and terminates processing of the flowchart in FIG. 4.

Next, an explanation will be given on warning control processing in FIG. 4 when the object region is set to the first region Ar1 at the third time point t3 in the next control cycle after the second time point t2.

The monitoring device 1 extracts the objects T1, T3 as in-region objects in step ST101. Then, in the following step ST102, the monitoring device 1 determines that the in-region object T3 is a new in-region object in the object region (first region Ar1), and thus determines there is a new in-region object in the object region (first region Ar1).

If the monitoring device 1 has determined in step ST103 there was an in-region object in the object region (first region Ar1) in the last control cycle (if the above-mentioned second condition is met), it proceeds to step ST105. The monitoring device 1 determines in step ST105 whether the driver is looking aside or not. The monitoring device 1 determines that the driver is looking aside when a visual line direction of the driver detected by the visual line detecting camera 24 is not directed to a direction of the object region (first region Ar1).

A configuration for performing processing in the present step ST105 corresponds to the gaze determining unit 13.

In addition, in the case where the monitoring device 1 has determined in step ST 105 that the driver is looking aside, even if it already gave warning of the in-region object T1 present in the object region (first region Ar1) at the first time point t1, there is a possibility that the driver has not recognized the in-region object T3 at the third time point t3.

For this reason, in this case, the monitoring device 1 does not restrain warning and performs above-mentioned step ST104 to give warning of the in-region object T3. This allows the driver's attention to be directed to the new in-region object T3.

On the other hand, if the monitoring device 1 has determined in step ST105 that the driver is not looking aside, it proceeds to step ST106. In step ST106, the monitoring device 1 determines whether or not a type of the new in-region object is different or not from all types of one or multiple old in-region objects (in-region objects present in the object region (first region Ar1) in the last control cycle). The monitoring device 1 has identified the type of each object by a result of template matching performed when the object was extracted from the photographic image in step ST1.

A configuration for performing processing in the present step ST106 corresponds to the type detecting unit 14.

As described above, the in-region objects T1, T3 are both humans. Therefore, the monitoring device 1 determines that the type (human) of the in-region object T3 determined to be the new in-region object in step ST102 is the same as the type (human) of the in-region object T1 which is the old in-region object.

If the monitoring device 1 has determined in step ST106 that the type of the new in-region object is the same as that of any of the one or multiple old in-region objects, it proceeds to step ST107. In step ST107, the monitoring device 1 only performs the image display processing of the image display processing and the sound generating processing. This restrains warning compared with warning in step ST104.

It is assumed that at the third time point t3, the driver has recognized the new in-region object T3 because the driver is in a state of paying attention to the object region (first region Ar1) due to warning of the in-region object T1 already given at the first time point t1. For this reason, restraining warning can prevent the driver from feeling bothersome about warning.

In the embodiment, the monitoring device 1 displays a frame (dashed frame F3 in FIG. 6C) displayed in image display processing when warning is restrained (when step ST107 is performed) and a frame (for example, a solid frame F1 in FIG. 6C) displayed in image display processing when warning is given (when step ST104 is performed) in an easily distinguishable manner (for example, displays them changing colors, shapes, or the like). This allows the driver of the vehicle 2 to visually distinguish between an in-region object of which warning is given and an in-region object of which warning is restrained when the driver looks at the screen 23a of the display device 23.

A configuration for performing processing in steps ST102-ST107 corresponds to the warning control unit 12.

The monitoring device 1 terminates the flowchart in FIG. 4 when processing in step ST107 ends.

Next, an explanation will be given on warning control processing when the object region is set to the second region Ar2 in step ST3 in FIG. 3 at each of the first time point t1 to the third time point t3 referring to FIG. 4.

First, at the first time point t1, the monitoring device 1 tries extracting an in-region object in the object region (second region Ar2) in step ST101. At this time, because there is no in-region object in the object region (second region Ar2), no in-region object is extracted. Therefore, the monitoring device 1 determines in step ST102 that there is no new in-region object, and terminates the flowchart in FIG. 4.

Because there is no in-region object in the object region (second region Ar2) at the second time point t2 and the third time point t3 either in the same way as at the first time point t1, the monitoring device 1 determines in step ST102 that there is no new in-region object, and terminates the flowchart in FIG. 4.

Next, an explanation will be given on warning control processing when the object region is set to the third region Ar3 in step ST4 in FIG. 3 in the order front the first time point t1 to the third time point t3 referring to FIG. 4.

First, at the first time point t1, the monitoring device 1 tries extracting an in-region object in the object region (third region Ar3) in step ST101. At this time, because there is no in-region object in the object region (third region Ar3), no in-region object is extracted. Therefore, the monitoring device 1 determines in step ST102 that there is no new in-region object, and terminates the flowchart in FIG. 4.

At the following second time point t2, the monitoring device 1 extracts the object T2 present in the object region (third region Ar3) as an in-region object in step ST101. Then, the monitoring device 1 determines in step ST102 that there is a new in-region object in the object region (third region Ar3), determines in step ST103 that there was no in-region object in the object region (third region Ar3) in the last control cycle, gives warning of the in-region object T2 in step ST104, and terminates the flowchart in FIG. 4.

At the following third time point t3, the monitoring device 1 extracts the objects T2. T4 present in the object region (third region Ar3) as in-region objects in step ST101. Then, the monitoring device 1 determines in step ST102 that there is a new in-region object in the object region (third region Ar3), determines in step ST103 that there was art in-region object in the object region third region Ar3) in the last control cycle, and proceeds to step ST105. If the monitoring device 1 has determined in step ST105 that the driver is not looking aside, it proceeds to step ST106.

As described above, the in-region object T2 is a human, and the in-region object T4 is a deer. Therefore, the monitoring device 1 determines that the type (deer) of the in-region object T4 determined to be the new in-region object in step ST106 is different from the type (human) of the in-region object 12 which is the old in-region object, and proceeds to step ST104.

The monitoring device 1 needs to respond differently in step ST104 due to appearance of the in-region object T4 whose type is different even when there is a high probability that the driver's attention is already directed to the third region Ar3 by giving warning of the in-region object T2 present in the object region (third region Ar3) at the second time point t2. Therefore, the monitoring device 1 can prompt the driver to respond depending on the type of object by giving warning of the new in-region object T4 whose type is different.

The monitoring device 1 terminates the flowchart FIG. 4 when processing in step ST104 ends.

Although in the embodiment the monocular camera 21 is used as the thing detecting device, it may be, for example, a stereo camera. Furthermore, the thing detecting device of the present invention may be, for example, a device which detects a thing by using a radar as long as it has a configuration capable of detecting a thing.

In the embodiment, the thing detecting device is arranged such that it can detect a thing situated in front of the vehicle, but it may be arranged such that it can detect a thing in any direction (for example, rearward) among directions which could be the travelling direction of the vehicle.

In the embodiment, three contact determination regions such as the first region Ar1 to the third region Ar3 are set, but the number of set contact determination regions may be one, or any number of two or more.

In the embodiment, the gaze determining unit 13 detects a visual line of the driver and determines whether the driver is looking aside or not, but a vehicle periphery monitoring device may be configured without comprising a configuration of such a gaze determining unit. In that case, processing in step ST105 in FIG. 4 is removed, and the vehicle periphery monitoring device is configured to proceed to step ST106 when a determination result in step ST103 is YES.

In the embodiment, the type detecting unit 14 detects a type of in-region object, but a vehicle periphery monitoring device may be configured without comprising a configuration of such a type detecting unit. In that case, processing in step ST106 in FIG. 4 is removed, and the vehicle periphery monitoring device is configured to proceed to step ST107 when a determination result in step ST105 is NO.

A vehicle periphery monitoring device may be configured without comprising configurations of the gaze determining unit and the type detecting unit. In that case, processing of steps ST 105 and ST106 in FIG. 4 is removed, and the vehicle periphery monitoring device is configured to proceed to step ST107 when a determination result in step ST103 is YES.

INDUSTRIAL APPLICABILITY

As described above, the vehicle periphery monitoring device of the present invention is useful to monitor the periphery of a vehicle because of being capable of preventing a driver from feeling bothersome about warning by restraining warning of a new object when the new different object has been detected in a region where an object was detected in the last control cycle.

REFERENCE SIGNS LIST

1 Monitoring device (vehicle periphery monitoring device)
2 Vehicle
21 Camera (thing detecting device)
22 Sound generating device
23 Display device
T1, T2, T3, T4 In-region object
Ar1 First region
Ar2 Second region
Ar3 Third region (second region)
11 In-region object detecting unit
12 Warning control unit
13 Gaze determining unit
14 Type detecting unit

The invention claimed is:

1. A vehicle periphery monitoring device comprising:
an in-region object detecting unit which detects an in-region object that is an object present in a contact determination region set at a periphery of a vehicle, based on detection data obtained by a thing detecting device which is mounted on the vehicle and detects a thing per prescribed control cycle; and
a warning control unit which performs warning control processing to give warning of a detected in-region object when the in-region object was not detected by the in-region object detecting unit in a last control cycle, but the in-region object is detected by the in-region object detecting unit in a present control cycle, and to restrain warning of a new in-region object when the in-region object was detected by the in-region object detecting unit in the last control cycle and the new in-region object different from the in-region object detected in the last control cycle is detected by the in-region object detecting unit in the present control cycle, wherein
a plurality of the contact determination regions are set;
the in-region object detecting unit detects the in-region object in each contact determination region; and
the warning control unit performs the warning control processing for each contact determination region.

2. The vehicle periphery monitoring device according to claim 1, wherein
the plurality of contact determination regions are composed of a first region situated in a travelling direction of the vehicle and two second regions situated in left and right directions of the vehicle relative to the first region.

3. The vehicle periphery monitoring device according to claim 1,
comprising a gaze determining unit which determines whether or not a driver of the vehicle is gazing at the contact determination regions, wherein
the warning control unit gives warning of the new in-region object without restraining warning of the new in-region object if the driver of the vehicle is determined to be not gazing at the contact determination regions by the gaze determining unit.

4. The vehicle periphery monitoring device according to claim 1,
comprising a type detecting unit which detects a type of the in-region object, wherein
the warning control unit gives warning of the new in-region object without restraining warning of the new in-region object if a type of the new in-region object detected by the type detecting unit in the present control cycle is different from a type of the in-region object detected by the type detecting unit in the last control cycle.

5. The vehicle periphery monitoring device according to claim 1, wherein
the warning control unit:
performs, as the warning, image display processing to display a position corresponding to a real space position of the in-region object on a display device mounted on the vehicle, and sound generating processing to generate attention calling sound from a sound generating device mounted on the vehicle; and
restrains the warning by only performing the image display processing among the image display processing and the sound generating processing.

* * * * *